US006754570B2

(12) United States Patent
Iihoshi et al.

(10) Patent No.: US 6,754,570 B2
(45) Date of Patent: Jun. 22, 2004

(54) SERVICE PROVIDING METHOD AND SYSTEM

(75) Inventors: Akira Iihoshi, Utsunomiya (JP); Yuji Kameoka, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/207,875

(22) Filed: Jul. 31, 2002

(65) Prior Publication Data

US 2003/0028297 A1 Feb. 6, 2003

(30) Foreign Application Priority Data

Jul. 31, 2001 (JP) .................................... P2001-231497

(51) Int. Cl.$^{7}$ ................................................ G06F 19/00
(52) U.S. Cl. ............................ 701/33; 701/29; 340/438
(58) Field of Search ............................. 701/33, 29, 35; 340/438

(56) References Cited

U.S. PATENT DOCUMENTS 6,339,736 B1 * 1/2002 Moskowitz et al. .......... 701/29
2002/0004747 A1 * 1/2002 Nishioka ..................... 705/14

FOREIGN PATENT DOCUMENTS

JP 10-103987 4/1998

* cited by examiner

*Primary Examiner*—Marthe Y. Marc-Coleman
(74) *Attorney, Agent, or Firm*—Arent Fox PLLC

(57) ABSTRACT

A vehicle 2 performs fault diagnosis of the vehicle and calculation of the service life of parts using information obtained from sensors and control units, and when the necessity for repair work of the vehicle arises, makes a repair request to an information center 1. The information center 1 having received the repair request notifies terminals of outlets 4 of the repair request, to request the outlets 4 to transmit a service condition of their shop. The outlets 4 transmit the service conditions of the shop to the information center 1, in response to the repair request. The information center 1 relays the received service condition of each outlet 4 to the user, so that the user can select a desired service condition. The information center 1 then transmits contract completion information to the outlet 4 having proposed the service condition selected by the user, to mediate an agreement between the user and the outlet 4.

13 Claims, 11 Drawing Sheets

SERVICE PROVIDING METHOD AND SYSTEM

BACKGROUND OF THE INVENTION

1. Field of the Invention

The present invention relates to a service providing method of a service control system used for the repair work of vehicles and sales of vehicle parts.

2. Description of the Related Art

Recently, there has been proposed an apparatus which is mounted on a vehicle and which monitors the condition of parts and equipment constituting the vehicle, and consumables such as engine oil which is being used, and when a problem occurs in the vehicle, guides the vehicle to a place such as an outlet or a service station, which provides services such as checking, replacement, replenishment and supplement of the parts, equipment and consumables.

As such apparatus, there can be mentioned an information presentation apparatus described in, for example, Japanese Unexamined Patent Application, First Publication No. Hei 10-103987. This information presentation apparatus comprises; a monitoring unit which monitors the condition of the vehicle, equipment mounted on the vehicle, or the degradation level of consumables, a position measurement unit which measures the current position of the vehicle, and a destination determination unit which determines a guided destination based on the condition of the vehicle and the current position. When the necessity for checking, replacement, replenishment or supplement of parts, equipment or consumables arises in the vehicle, the information presentation apparatus displays the route information to the guided destination, such as an outlet or a service station, based on the current position, to thereby notify the driver of the vehicle.

However, even if the above described information providing apparatus is used, there is a problem in that when being guided to an outlet or a service station and requesting repair or the like, there may be a case where there is no stock of the part or consumable, or a case where checking, replacement, replenishment or supplement cannot be performed right away. Therefore, a user has to go to the outlet or service station twice for checking and for replacement of the part.

On the side of the outlet or service station, there is such a problem that since the information providing apparatus automatically determines the outlet or service station to which the vehicle is guided, based on the situation of the problem occurring in the vehicle and the position information of the vehicle, free competition between the outlets and the service stations is not possible.

Moreover, since the information providing apparatus notifies the user of the servicing period of the vehicle, such as appropriate replacement time for parts, not relying on the judgment of the user, then vehicles serviced many times heretofore according to the judgment of the user become subjected to servicing at appropriate times. Therefore, there is a merit to the user, but demerit for the outlets and the service stations in that their income may decrease.

SUMMARY OF THE INVENTION

In view of the above situation, it is an object of the present invention to provide a service providing method of a service control system used for repair work of vehicles and sales of vehicle parts based on the information obtained by the vehicle itself, wherein appropriate information is provided to users and vehicle component facilities as well as outlets, to thereby improve the benefit and convenience of the whole system.

The service providing method according to the first aspect of the present invention uses a service control system. This service control system comprises: a determination apparatus which is mounted on a vehicle and determines the condition of repair parts; an information center which controls determination information output from the determination apparatus; outlets which manage the stock of the repair parts and the repair work of the vehicle; and a communication network which connects the vehicle, the outlets and the information center.

The service providing method comprises: transmission processing in which the determination information is transmitted from the determination apparatus to the information center; service condition selection processing in which service conditions related to the outlets transmitted from the information center are offered to an administrator of the vehicle in response to the transmission of the determination information so as to allow the administrator to select a desired service condition from the service conditions; service condition notification processing in which the desired service condition selected by the administrator is transmitted to the information center; and service confirmation processing in which the outlet corresponding to the desired service condition or the information center transmits confirmation information with respect to the desired service condition to the administrator.

As a result, when the necessity for repair work arises in a vehicle, a repair request desiring repair work is transmitted to the information center, to request the information center to mediate with an outlet which performs repair work. Then, a plurality of service conditions of respective outlets is transmitted from the information center. Therefore, the administrator of the vehicle selects a desired service condition, and notifies the information center of the selection from the vehicle. The confirmation information of the outlet mediated by the information center is transmitted, depending on the service condition selected by the administrator of the vehicle, and hence the administrator inputs a response to the confirmation information, which becomes a final confirmation of agreement.

The service providing method according to the second aspect of the present invention uses the same system as that of the first aspect, and comprises: transmission processing in which the determination information from determination apparatus and identification information of the vehicle are transmitted from the vehicle to the information center; outlet selection processing in which at least one outlet capable of providing repair work correspond to the determination information for an administrator of the vehicle corresponding to the identification information is selected; service information providing processing in which a repair request for the vehicle is transmitted to selected outlets; service condition relay processing in which the information center receives service conditions of the selected outlets transmitted from the selected outlets in response to the transmission of the repair request, and transmits the service conditions to the administrator so as to allow the administrator to select a desired outlet; and service mediation processing in which contract completion information for the repair work is transmitted to the desired outlet.

According to the second aspect, the information center, on receiving a request for repair work together with the identification information from the vehicle, selects an outlet capable of providing repair work of the vehicle, for the administrator, based on the information of the administrator of the vehicle corresponding to the identification information. Then, the information center notifies the selected outlet of the information of the repair request and proposes the service condition to the outlet. The information center notifies the administrator of the vehicle of the proposed service conditions of each outlet, and when the administrator selects a desired service condition, transmits the contract completion information to the outlet which has proposed the service condition selected by the administrator, to thereby mediate the agreement between the administrator and the outlet.

DETAILED DESCTRIPTION OF THE INVENTION

Embodiments of the present invention will be described below with reference to the drawings. The present invention is not limited only to these embodiments, various modifications can be achieved in the scope of claims.

Figure 1:
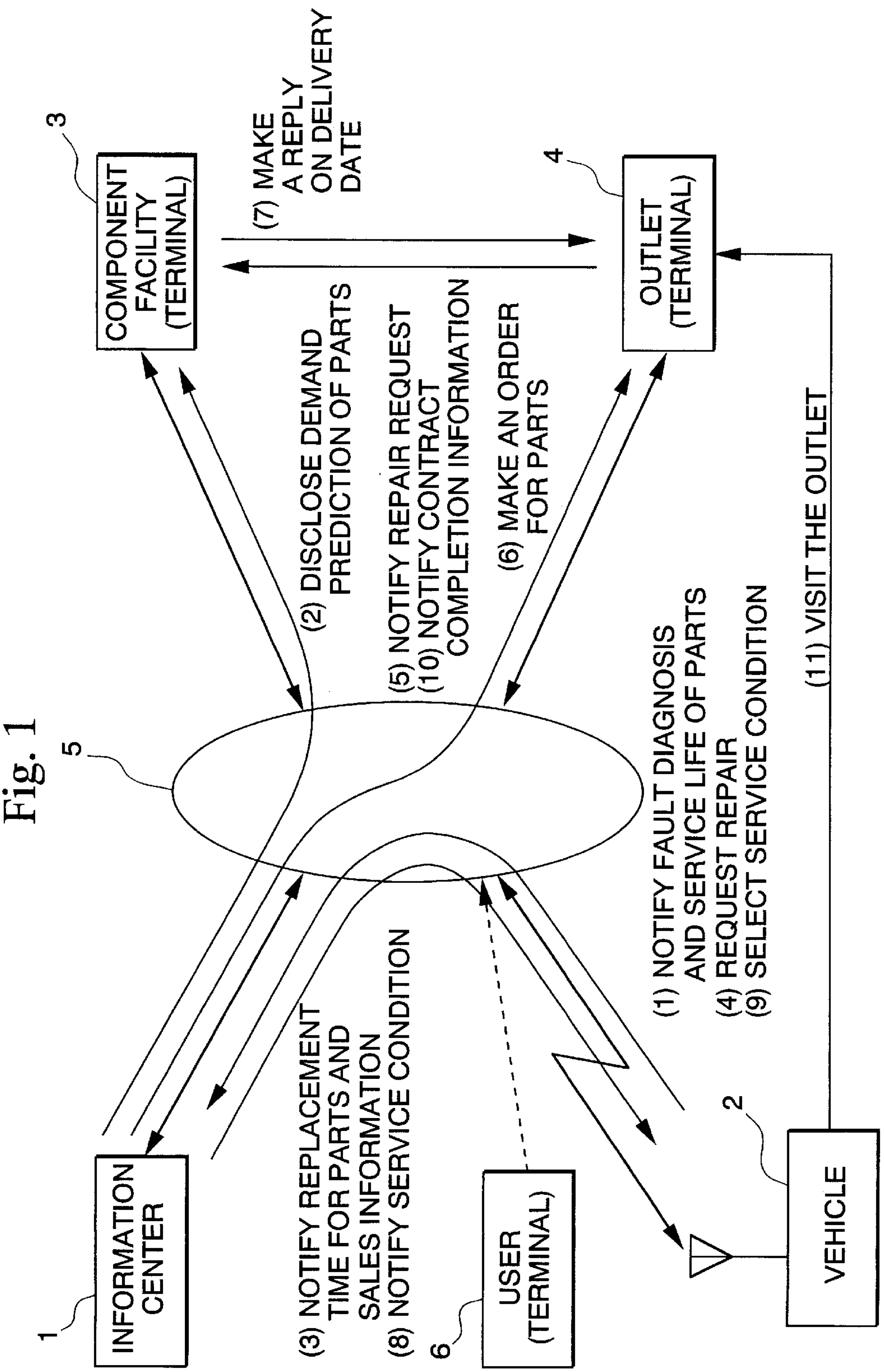
FIG. 1 is a block diagram showing a service control system in one embodiment of the present invention.

FIG. 1 is a block diagram showing the construction of an embodiment of the present invention. As shown in FIG. 1, the service control system in this embodiment connects an information center 1, vehicles 2, a component facility 3 having a client terminal and outlets 4 having a client terminal, via a communication network 5, to efficiently perform repair work of vehicles and sales of vehicle parts.

The information center 1 in the service control system in this embodiment is an information control center which performs processing such as control of repair work schedules of vehicles, prediction of a demand for parts for repair work, and sales support for the vehicle components, based on information transmitted from a vehicle 2. The information control center has a server function, and transmits the information through the communication network 5.

The vehicle 2 comprises; a control section and a communication unit which obtain the condition of the vehicle from various sensors and various control units mounted thereon, and notify the information center 1 of the fault diagnosis result and the monitoring result of the service life of parts, together with identification information such as the vehicle number via the communication network 5, as well as an input operation section and a display section for controlling and displaying the information.

The component facilities 3 are factories for manufacturing parts and consumables for the vehicle, and also for manufacturing repair parts including optional parts fitted to the vehicle and selected by a user, being an administrator of the vehicle 2 (including an owner or a user of the vehicle), and comprises a client terminal capable of transferring information between the information center 1, vehicles 2 and outlets 4 via the communication network 5.

The outlet 4 is an outlet which performs sales and repair work for the vehicle 2 and also sales of vehicle parts, and as in the component facility 3, has a client terminal capable of transferring information between the information center 1, vehicles 2 and outlets 4 via the communication network 5.

The communication network 5 is one for connecting the information center 1, the vehicles 2, the component facility 3 and the outlets 4, and transfers information, for example, by wireless communication by WAP (Wireless Application Protocol), by the Internet using the WWW (World Wide Web), or wired by communication via a public network such as PSTN (Public Switch Telephone Network) and ISDN (Integrated Services Digital Network).

The information center 1, the vehicles 2, the component facility 3 having the client terminal and the outlets 4 having the client terminal constitute a POS system (point of sale scanning: Point of Sales system) connected by the communication network 5.

The information provided from the information center 1 to users is transmitted to the vehicle 2 and displayed on a display section of the vehicle, and may also be transmitted to a user 6 having a terminal connectable to the communication network 5 such as a mobile phone or a portable information terminal held by the user, or a computer terminal installed at home.

The operation of the service control system in this embodiment will be briefly described, with reference to FIG. 1.

The determination apparatus of the vehicle 2 performs fault diagnosis of the vehicle and calculation of the service life of parts using the information obtained from sensors and control units mounted on the vehicle, and notifies the information center 1 of the result regularly ((1) Fault diagnosis, notification of service life of parts).

The information center 1 performs prediction of demands for parts, based on the fault diagnosis of the vehicle and the calculation result for the service life of parts, and discloses this to the terminal in the component facility 3 ((2) Prediction and disclosure of demand for parts).

The information center 1 notifies the vehicle 2 (user 6) of the replacement time for parts, and sales information of recommended parts, according to circumstances ((3) Notification of replacement time for parts and sales information).

When the vehicle 2 (user 6) has received the notification of replacement time for parts and equipment of the vehicle, and repair parts including consumables such as engine oil, from the information center 1, or when the necessity for repair work, for performing checking, replacement, replenishment and supplement of the repair parts arises in the vehicle, the vehicle 2 (user 6) transmits a repair request for parts, together with the vehicle number of the vehicle to the information center 1 ((4) Repair request).

The information center 1 having received the repair request notifies the repair request to the terminal of the outlet 4 capable of providing the repair work for the vehicle which has transmitted the repair request, and transmits the service condition ((5) Notification of repair request).

The outlet 4 places an order with the component facility 3 for the parts, as required ((6) Order of parts), and asks the component facility 3 to give a reply on delivery date ((7) Reply on delivery date). The outlet 4 then transmits the service condition based on this to the information center 1.

The information center 1 having received the service condition notifies the vehicle 2 (user 6) of the service condition ((8) Notification of service condition).

The user selects a service condition and notifies the information center 1 ((9) Selection of service condition).

The information center 1 notifies the outlet 4 selected by the service condition of the contract completion information ((10) Notification of contract completion information).

The user visits the outlet 4 in accordance with the selected service condition ((11) Come to the outlet).

The construction of the information center 1 used in this embodiment will be described with reference to the drawings.

Figure 2:
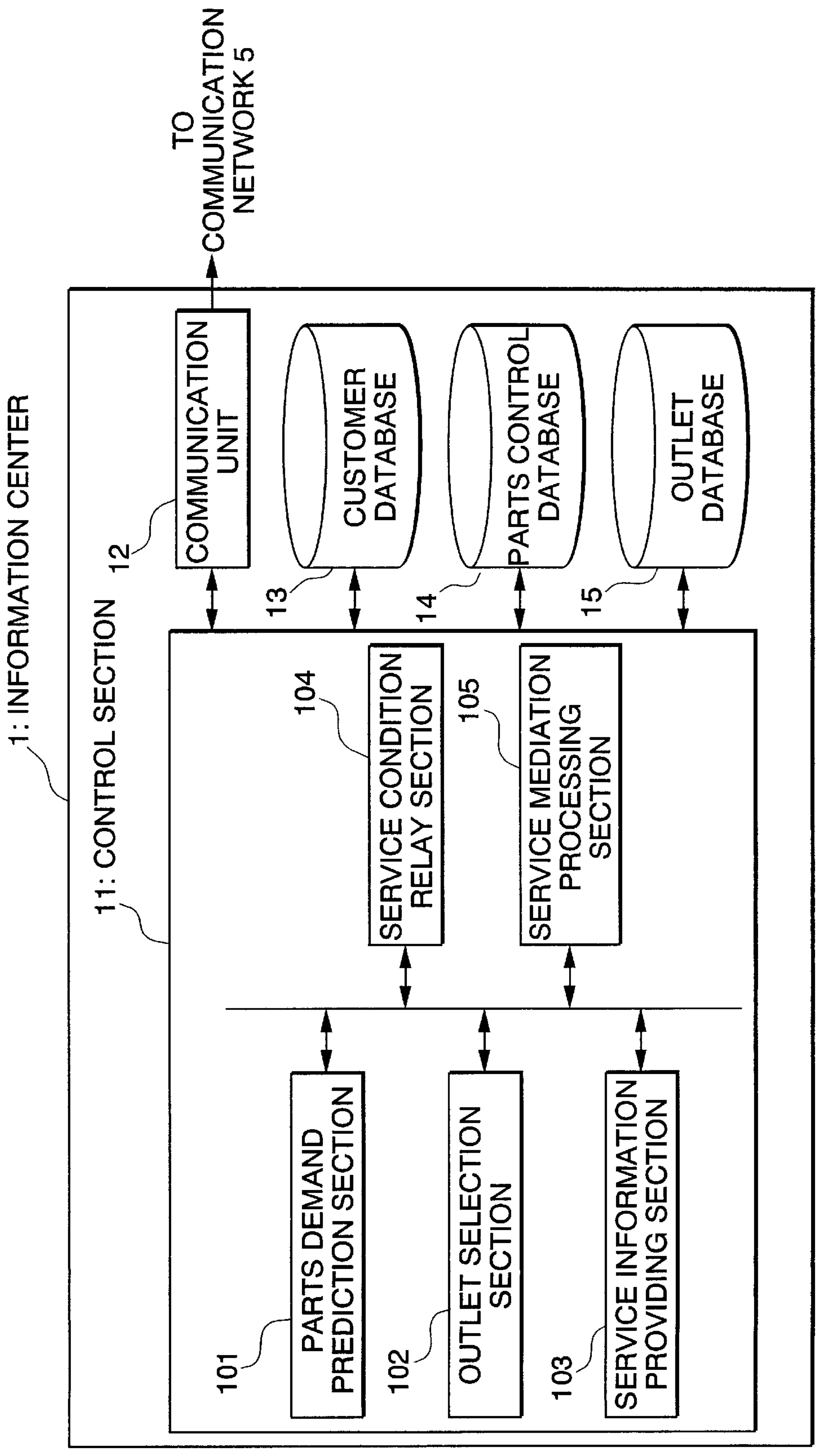
FIG. 2 is a block diagram showing an information center in the service control system in this embodiment.

As shown in FIG. 2, the information center 1 comprises; a control section 11, a communication unit 12, a customer database 13, a parts control database 14 and an outlet database 15.

The control section 11 executes a service control program to control the whole operation of the information center 1, and obtains the condition of the vehicle from the vehicle 2 to analyze this, in a computer system having a CPU (Central Processing Unit). By so doing, the control section 11 provides appropriate information and instruction to the user 6, the component facility 3 and the outlet 4, to control the whole operation of the service control system.

The communication unit 12 is one which allows the information center 1 to exchange information with the vehicles 2, the component facility 3 and the outlets 4 via the communication network 5, and may be either a wired communication unit or a wireless communication unit, so long as it can be connected to the communication network 5.

The customer database 13 is a database which stores the information related to the user, obtained at the time of selling the vehicle or parts thereof by a POS system, or obtained by a questionnaire or the like for the user.

The contents stored in the customer database 13 may be such that the user information and the information of the vehicle 2 are associated with each other one-to-one. However, the owner and the user of the vehicle 2 may be different. Therefore, it is desirable to store, for each user, an outlet which the user often uses, the history of parts purchased in the past, and the taste and preferences of the user, in addition to the name, address, telephone number and age of a plurality of users (owners or users), corresponding to the information such as the make, model, vehicle year, registration number, body number of the vehicle, the outlet which has sold the vehicle, and the repair history showing repair work performed on the vehicle. When information of a plurality of users is stored, it may be specified as to which user information is given priority.

The parts name of the component parts for each model of vehicles, or repair parts including consumables such as engine oil which is now being used and the parts number thereof, and parts name of optional parts and the parts number thereof, and the like are stored in the parts control database 14.

The name of the outlet and its location (address, or position coordinate expressed by longitude and latitude (position information) or the like), contact address, the range of serviceable area and the like (address or range by the position coordinates as in the location) are stored in the outlet database 15 for each outlet.

The control section 11 has a parts demand prediction section 101 which predicts the demand for each part, based on the statistics of all vehicles registered in the customer database 13 (all vehicles controlled by the information center 1), by checking the calculation result of the service life of the parts included in the determination information of the vehicle obtained from the vehicle 2, and the history of the parts purchased by the user in the past stored in the customer database 13. Moreover, the control section 11 has; an outlet selection section 102 for searching the customer database 13 based on the vehicle number included in the repair request obtained from the vehicle 2, to select an outlet in a service area which includes the address or position information of the user of the vehicle, and a service information providing section 103 for transmitting a repair request including the information for the parts of the vehicle 2 to be replaced and the user, to the selected outlet. Furthermore, the control section 11 has; a service condition relay section 104 for relaying the service condition transmitted from the outlet 4 in response to the repair request, to the vehicle 2 or the user 6, and a service mediation processing section 105 which receives the information of the service condition selected by the user, from the vehicle 2 or the user 6 and transmits the contract completion information for the repair work to an outlet 4 which matches with the service condition selected by the user.

The control section 11 is connected to the input operation section and the display section (not shown).

The operation of the control section 11 will be described later in detail.

The customer database 13, the parts control database 14 and the outlet database 15 are constituted by a nonvolatile memory such as a hard disk drive, a magneto-optical disk drive or a flash memory, a volatile memory such as a RAM (Random Access Memory), or a computer readable and writable recording medium combining these. If the medium itself is renewed at the time of updating the storage contents, a recording medium such as CD-ROM capable of only readout may be used.

The parts demand prediction section 101, the outlet selection section 102, the service information providing section 103, the service condition relay section 104 and the service mediation processing section 105 are constituted by a memory and a CPU (Central Processing Unit). The function of each section described above may be realized by loading a program for realizing the function into the memory and executing the program, or may be realized by exclusive hardware.

The construction of the vehicle 2 used in this embodiment will now be described, with reference to the drawings.

Figure 3:
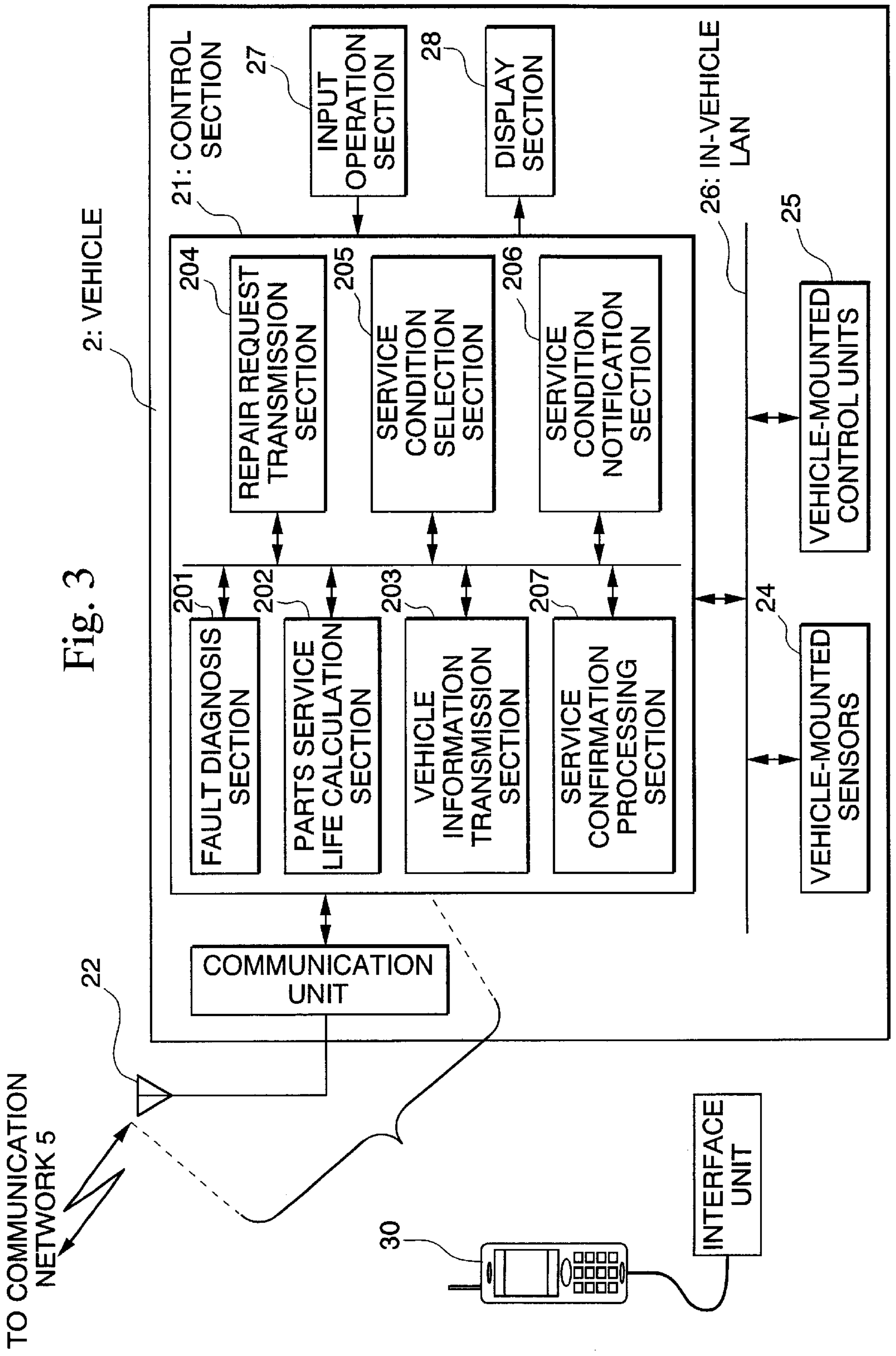
FIG. 3 is a block diagram showing a vehicle in the service control system in this embodiment.

As shown in FIG. 3, the vehicle 2 comprises; a control section 21, a communication antenna 22, a communication unit 23, sensors 24 mounted on the vehicle, control units 25 mounted on the vehicle, an in-vehicle LAN (Local Area Network) 26, an input operation section 27 and a display section 28. The communication antenna 22 and the communication unit 23 may be a mobile phone 30.

The control section 21 executes a vehicle condition control program in a computer system having the CPU (Central Processing Unit), and obtains the condition of the vehicle 2 from the vehicle-mounted sensors 24 and the vehicle-mounted control units 25 mounted in the vehicle 2, to control the determination information of the vehicle such as the fault diagnosis result and the monitoring result of the service life of the parts. The control section 21 also controls the communication for notifying the information center 1 of the determination information of the vehicle.

The communication antenna 22 is for transmitting the determination information of the vehicle and the repair request to the information center 1. This is connected to the communication unit 23 used for wireless communication, which transmits the determination information of the vehicle and the repair request controlled by the control section 21 over radio waves.

The vehicle-mounted sensors 24 include sensors, such as a vehicle speed sensor, a so-called G sensor, a brake switch for detecting the operation of the brake, a steering sensor for detecting the steering amount of the steering, a yaw rate sensor for detecting yaw rate, a shift position sensor for detecting the shift position, a throttle opening sensor for detecting the opening of a throttle valve, an engine speed sensor for detecting the engine speed, and respective oil temperature sensors for detecting the temperature of the engine oil and the ATF (Automatic Transmission Fluid) oil, and meters such as an integrating odometer. The vehicle-mounted sensors 24 further include a unit for obtaining the control condition of the vehicle driven by the driver, based on the condition of switches operated by the driver, such as a winker (direction indicator switch), a headlight switch or a wiper switch.

The vehicle-mounted control units 25 include; an engine fuel injection control system, various ECUs (Electronic Control Units) for a four-wheel antilock brake system which controls the braking of the vehicle, a traction control system which controls the drive of the vehicle, and an automatic transmission for controlling the transmission of the driving force, a position information providing apparatus, referred to as a navigation system utilizing a GPS (Global Positioning System), and control units which are arranged in each section of the vehicle for controlling meters and a door lock and the like, and which are used in controlling driving of the vehicle and controlling the operation and display.

The control section 21, the vehicle-mounted sensors 24 and the vehicle-mounted control units 25 are connected by the CAN (Controller Area Network) or the like constituting the in-vehicle LAN 26, thereby enabling two-way transfer of information.

The control unit 21 mounted on the vehicle 2, the communication antenna 22 and the communication unit 23 may function as a part of the position information providing apparatus referred to as the navigation system, and in this case, the position information of the outlet included in the service condition can be displayed as the information on a specific map. Moreover, average fuel consumption can be obtained as well as the accumulated mileage, as with the integrating odometer of the vehicle.

To the control section 21, there are connected an input operation section 27 which includes a key pad, buttons, a pointing device and the like provided for the user to operate the control section 21, and a display section 28 for displaying the condition of the vehicle 2 obtained from the vehicle-mounted sensors 24 and the vehicle-mounted control units 25, or the fault diagnosis result or the monitoring result for the service life of the parts, or displaying the information received from the information center 1. The display section 28 includes; a speech output unit which outputs sound and voice, a meter-integrated display which is integrated with meters of the vehicle which displays images and character information, a NAVI Display installed in the console of the vehicle, and a HUD (Head Up Display) which displays information at a position on the front window where the forward visibility of the driver is not blocked.

The control section 21 has; a fault diagnosis section 201 which performs fault diagnosis of the vehicle 2 based on the condition of the vehicle 2 obtained from the vehicle-mounted sensors 24 and the vehicle-mounted control units 25, a parts service life calculation section 202 which monitors the service life of the parts to calculate the replacement time, and a vehicle information transmission section 203 which transmits the result of the fault diagnosis section 201 and the parts service life calculation section 202 for each predetermined period to the information center 1 as the determination information of the vehicle. Moreover, the control section 21 has; a repair request transmission section 204 which transmits the repair request of the vehicle to the information center 1, when the necessity of repair work arises, and a service condition selection section 205 which displays a plurality of service conditions including the outlet names and the service contents received from the information center 1 to allow the user to select a desired service condition. Furthermore, the control section 21 has; a service condition notification section 206 which notifies the information center 1 of the service condition selected by the user, and a service confirmation processing section 207 which displays the confirmation information including the reserved date and the service content transmitted from the information center 1 or the outlet 4 on the display section 28, with respect to the service condition selected by the user, to allow the user to input a reply to the confirmation information.

The service life of the parts calculated by the parts service life calculation section 202 includes, for example; an engine oil deterioration parameter calculated based on the accumulated engine revolutions obtained from the engine revolution sensor and the oil temperature obtained from the oil temperature sensor, a tire wear parameter calculated based on the accumulated result of the mileage obtained from the integration odometer and the navigation system and the acceleration/deceleration obtained from the acceleration sensor, and a wiper deterioration parameter calculated based on the accumulated utilization time obtained from the control condition (ON/OFF) of the wiper switch and the elapsed time since the wiper was replaced.

The above described fault diagnosis and calculation of the service life of the parts may be performed on the control unit side included in the vehicle-mounted control units 25.

The operation of the control section 21 will be described later in detail.

The fault diagnosis section 201, the parts service life calculation section 202, the vehicle information transmission section 203, the repair request transmission section 204, the service condition selection section 205, the service condition notification section 206, and the service confirmation processing section 207 are constituted by the memory and the CPU (Central Processing Unit). The function of each section described above may be realized by loading a program for realizing the function into the memory and executing the program, or may be realized by exclusive hardware.

Next is a description of the operation of the service control system and the processing procedure in this embodiment, with reference to the drawings.

Figure 4:
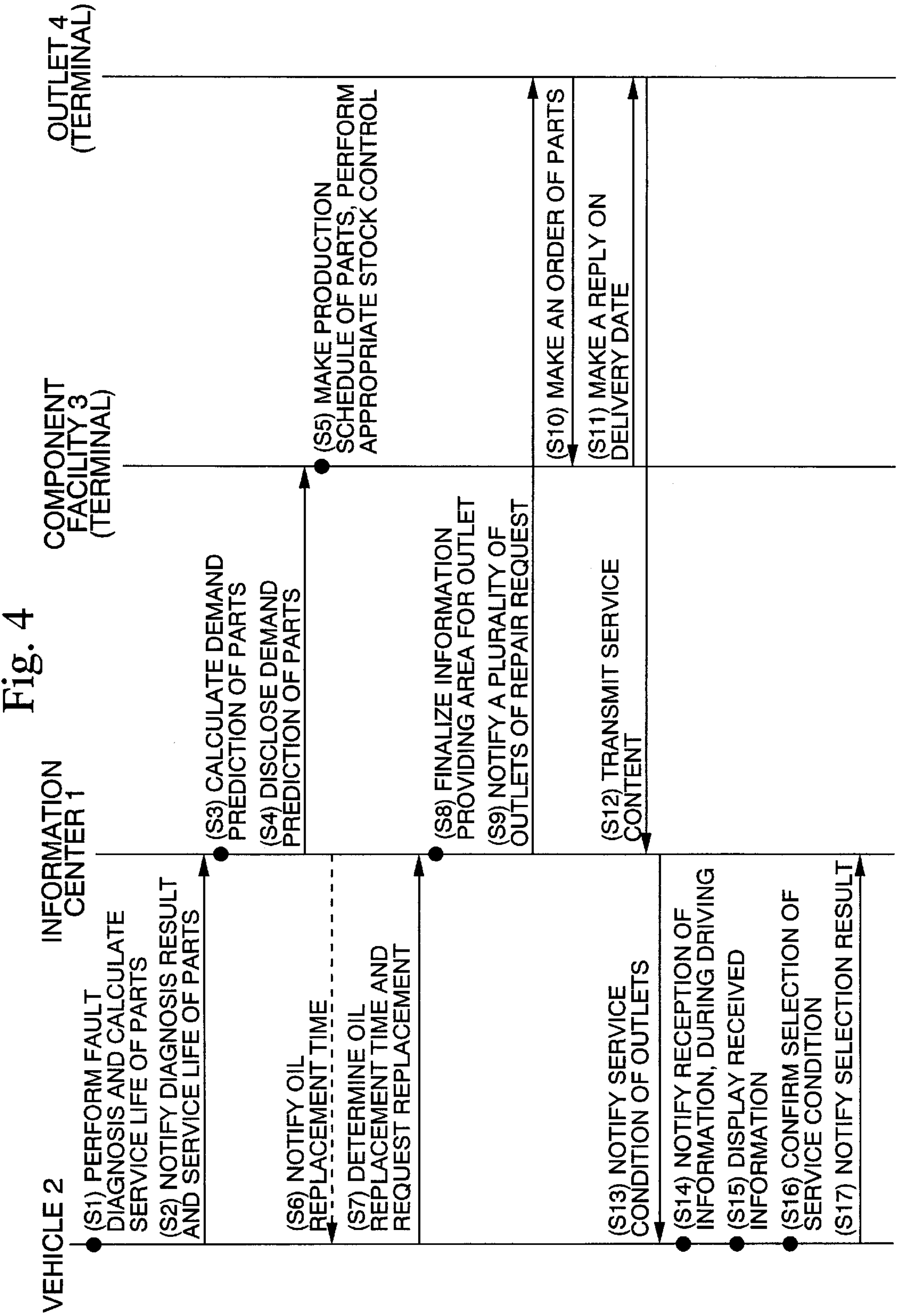
FIGS. 4 to 7 are sequence diagrams showing operations and processing procedures of the service control system in this embodiment.
Figure 5:
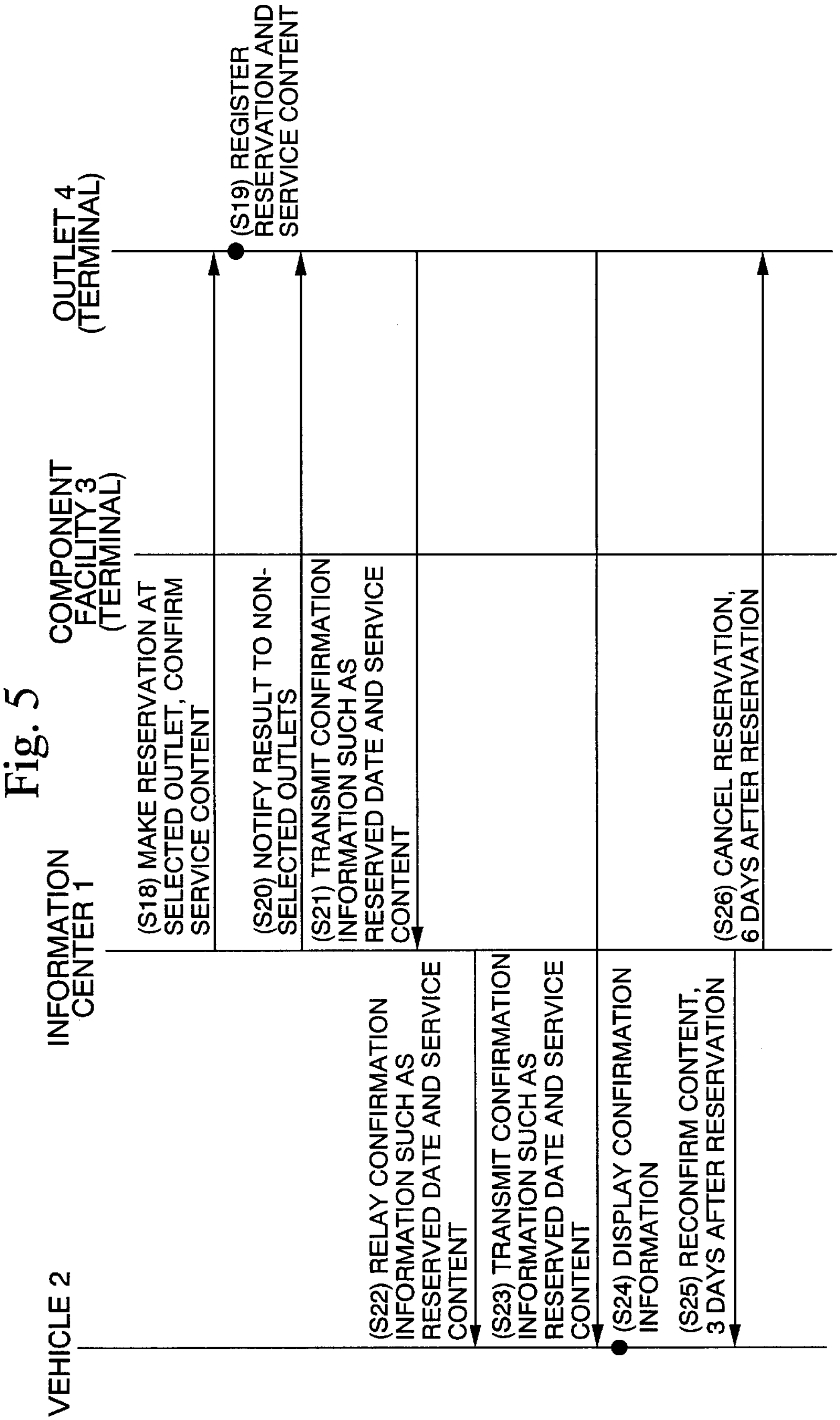

FIG. 4 to FIG. 7 are sequence diagrams showing the operation of the service control system and the processing procedure in this embodiment. Particularly, FIG. 4 and FIG. 5 show the processing procedure for replacing the engine oil or the ATF oil, as one example of parts and items which are difficult to be replaced by the user alone.

In the vehicle 2, the fault diagnosis section 201 performs fault diagnosis of the vehicle 2, based on the condition of the vehicle 2 obtained by the control section 21 from the vehicle-mounted sensors 24 and the vehicle-mounted control units 25. Moreover, the parts service life calculation section 202 calculates the replacement time of the parts based on the monitoring result of the service life of the parts, and continuously monitors the condition of the vehicle with respect to faults and checking (step S1).

In step S1, the result of fault diagnosis and the calculation result of the service life of the parts obtained by the vehicle 2 itself are transmitted regularly to the information center 1, by the vehicle information transmission section 203, via the communication unit 23 and the communication antenna 23 (step S2).

In the information center 1, the parts demand prediction section 101 predicts a demand for parts, based on the calculation result of the service life of the parts included in the determination information of the vehicle obtained from the vehicle 2, and the statistical results such as histories of the parts purchased by the user in the past, stored in the customer database 13 (step S3).

The result of demand prediction for parts in the information center 1 is disclosed to the component facility 3 via the terminal of the component facility 3 (step S4), and the component facility 3 makes a production schedule of parts and performs appropriate stock control (step S5).

On the other hand, the information center 1 may notify the replacement time for oil to the vehicle 2, according to circumstances (step S6).

When the vehicle 2 receives the notification of the replacement time for oil, or when the parts service life calculation section 202 determines that it is the replacement time for oil, the repair request transmission section 204 indicates the vehicle number of the vehicle 2 to the information center 1, to send a request for oil replacement (transmission of the repair request of the vehicle) (step S7).

The outlet selection section 102 in the information center 1 having received the repair request uses the vehicle number included in the repair request of the vehicle obtained from the vehicle 2 to search the customer database 13, and extracts an outlet 4 in the service area of which the obtained address or position information of the user of the vehicle 2 is included, from the outlet database 15. The outlet selection section 102 then finalizes the information providing area with respect to the outlets 4 stored in the outlet database 15 (step S8).

The service information providing section 103 notifies the terminal of the outlets 4 included in the finalized information providing area, of the user information together with the repair request (step S9).

The outlets 4 having received the notification of the user information together with the repair request confirms the stock status of the parts, and if necessary, places an order for the parts to the component facility 3 via the terminal (step S10).

The component facility 3 having received the order for the parts calculates the date of delivery, in accordance with the production schedule of the parts and the result of the appropriate stock control in step S5, and gives a reply of the delivery date to the outlet 4 via the terminal (step S11).

The outlet 4 having received the reply on the delivery date from the component facility 3 transmits the service content for the parts replacement at its own shop, recommended products, reservation status, and information of campaigns or the like, to the information center 1 from the terminal (step S12).

The service content for replacing the parts and the recommended products include; for example, the service content such as the time required for replacing the oil and the cost, and information on the recommend oil filter for the replacement and information recommending flushing.

In the information center 1, having received the service content for the parts replacement, the recommended products, reservation status and the information of campaigns or the like, transmitted in response to the notification of the repair request from the outlet 4, the service condition relay section 104 relays the notification of the service condition transmitted from the outlet 4 to the vehicle 2 (step S13).

When the notification of the service content is received during driving, the vehicle 2 notifies the vehicle administrator (user), being the driver, of the information reception (step S14).

The service condition selection section 205 in the vehicle 2 displays a plurality of service conditions including the outlet names and the service contents received from the information center 1 on the display section 28 (step S15), to allow the user to select a desired service condition such as the outlet to be used (step S16).

The service condition notification section 206 then notifies the information center 1 of the service condition selected by the user (step S17).

On the other hand, in the information center 1, having received the selection result of the service condition, the service mediation processing section 105 receives the service condition such as the outlet to be used, selected by the user of the vehicle 2, and transmits the contract completion information for confirming the reservation and the service content to the terminal of the outlet 4 which has been selected as the outlet to be used (step S18).

The outlet 4 having received the contract completion information registers the reservation content and the service content in an internal business control system (step S19).

The service mediation processing section 105 in the information center 1 having received the selection result of the service condition notifies the outlets which are not selected of this matter (step S20).

The outlet 4 having registered the contract completion information in the internal business control system transmits the confirmation information including the reserved date and the service content to the information center 1 from the terminal (step S21), and the information center 1 further relays the confirmation information of the reserved date and the service content to the vehicle 2 (step S22).

The vehicle 2 may receive the confirmation information including the reserved date and the service content directly from the outlet 4 (step S23).

In the vehicle 2 having received the confirmation information including the reserved date and the service content from the outlet 4 or the information center 1, the service confirmation processing section 207 displays this on the display section 28 (step S24), to allow the user to input a reply to the confirmation information.

The user visits the outlet 4 on the reserved date for receiving oil replacement of the vehicle 2.

In step S22, if there is no reply to the confirmation information from the service confirmation processing section 207 of the vehicle 2, for example, within three days since the confirmation information including the reserved date and the service content was transmitted to the vehicle 2, the information center 1 notifies the user of the vehicle 2 of the reconfirmation of the content (step S25), and if there is no reply to the confirmation information from the service confirmation processing section 207 of the vehicle 2, for example, within six days, the information center 1 instructs cancellation of the reservation to the outlet 4 (step S26).

Figure 6:
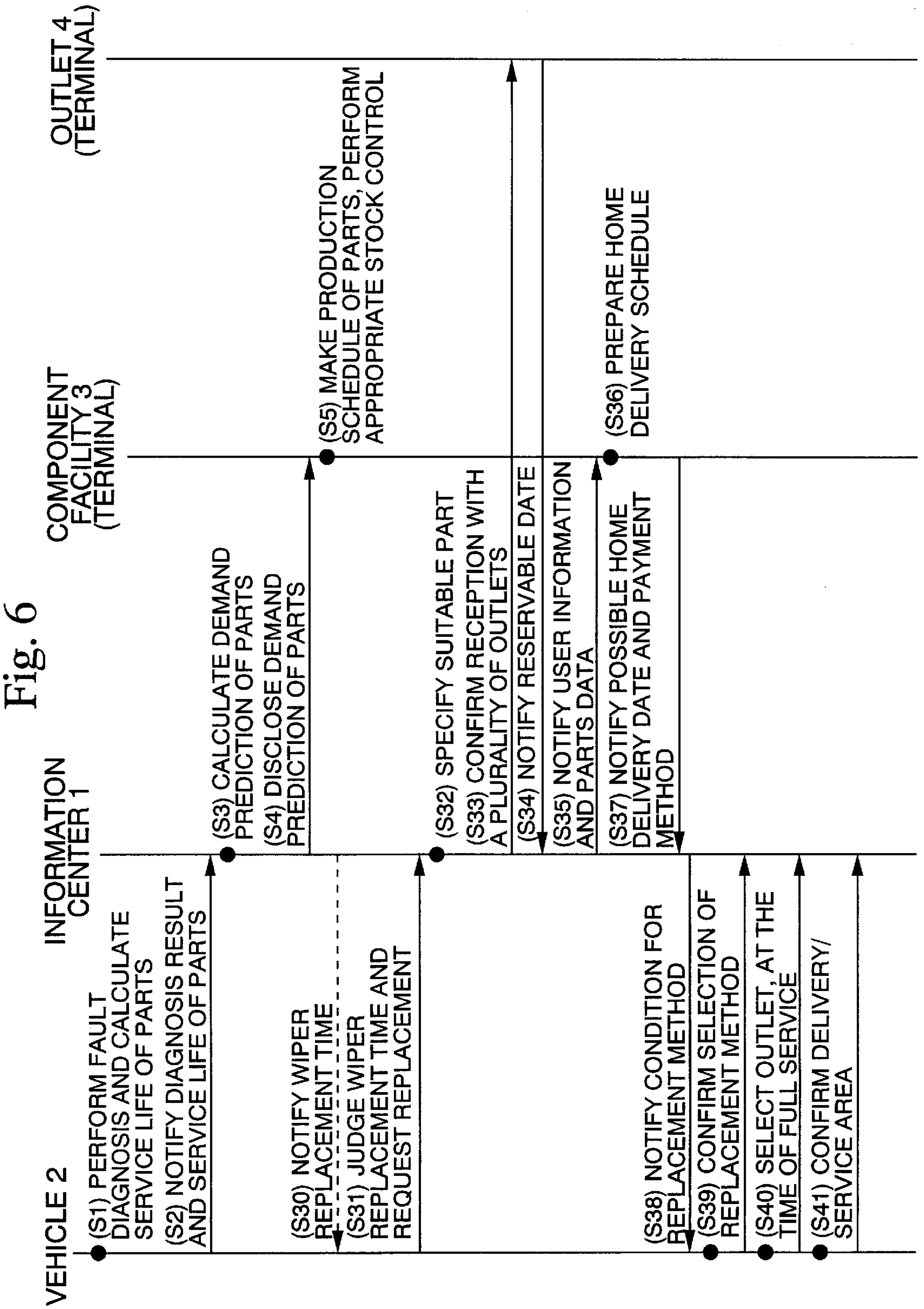
Figure 7:
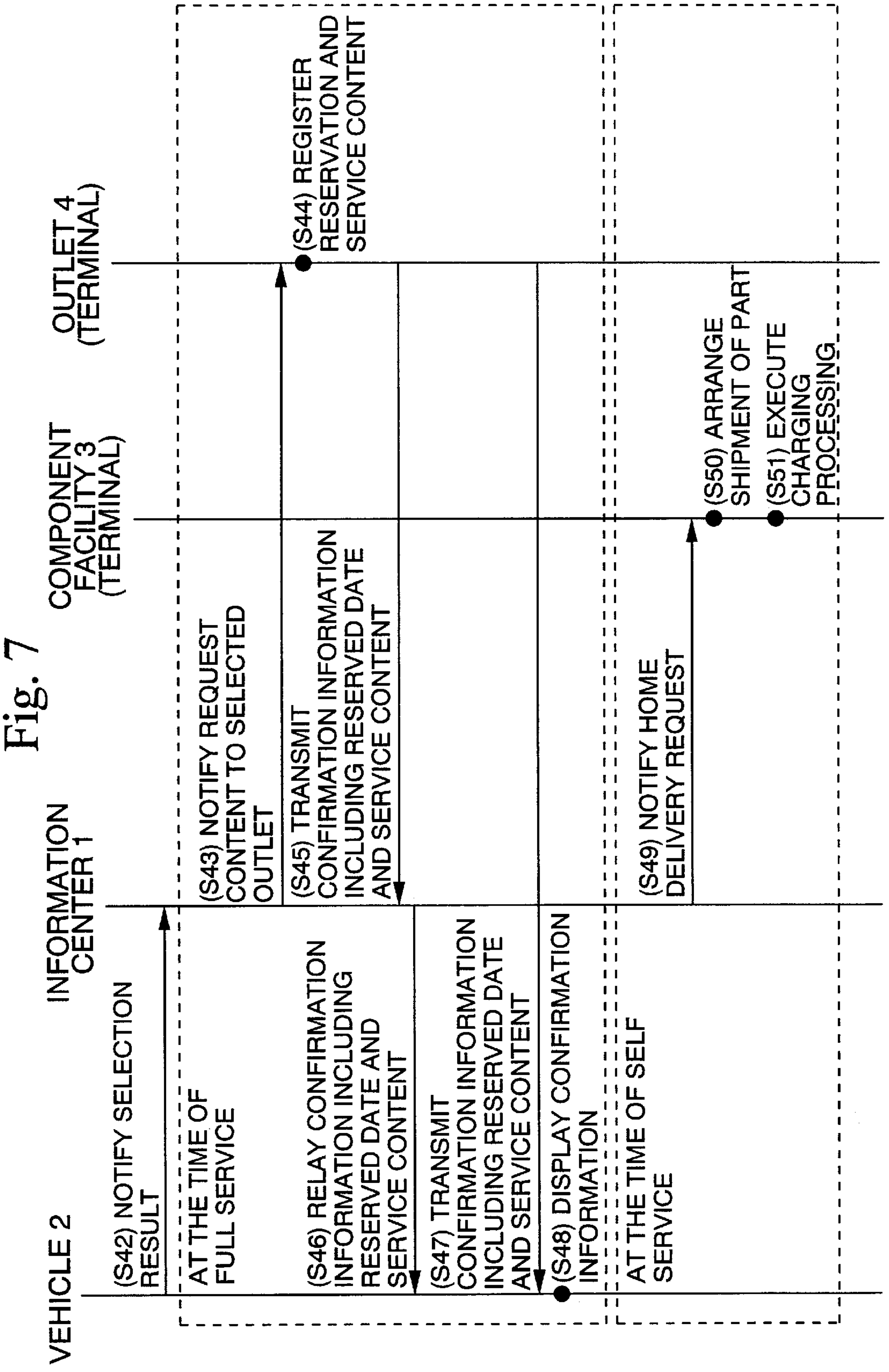

The processing procedure for replacing a wiper will be described with reference to FIG. 6 and FIG. 7, as an example of parts and items which the user can replace.

Also in this example, as in the example shown in FIG. 4 and FIG. 5, the vehicle 2 performs status monitoring of the vehicle based on the information obtained from the vehicle-mounted sensors 24 and the vehicle-mounted control units 25, and the component facility 3 makes a production schedule of parts and performs appropriate stock control, based on the result of demand prediction for the parts performed by the information center 1 (step S1 to step S5).

Under this situation, the information center 1 may notify the replacement time for the wiper to the vehicle 2, according to circumstances (step S30).

When the vehicle 2 receives the notification of the replacement time for the wiper, or when the parts service life calculation section 202 determines that it is the replacement time for the wiper, the repair request transmission section 204 indicates the vehicle number of the vehicle 2 to the information center 1, to send a request for wiper replacement (transmission of the repair request of the vehicle) (step S31).

The outlet selection section 102 in the information center 1 having received the repair request searches the parts control database 24, based on the vehicle number included in the repair request of the vehicle obtained from the vehicle 2 and specifies the suitable parts for the vehicle 2 (step S32).

The service information providing section 103 notifies the terminal of the outlet 4 included in the information providing area of the user information together with the repair request, based on the information of the defined suitable parts, to confirm the reception (step S33).

The outlet 4 having received the notification of the user information together with the repair request confirms the stock status of the parts and the business schedule (reservation status), and notifies the information center 1 of the date and time zone capable of receiving the reservation from the terminal (step S34).

On the other hand, the service information providing section 103 in the information center 1 notifies the terminal of the component facility 3, of the user information and the repair parts data (step S35).

The component facility 3 having received the user information and the parts data prepares a home delivery schedule based on the address or position information of the user included in the user information, and the stock status of the parts based on the production schedule of the parts and the result of the appropriate stock control in step S5 (step S36).

The component facility 3 notifies the information center 1 of the possible home delivery date of the parts from the terminal, and the payment method (step S37).

In the information center 1, having received the reservable date of the outlet 4 and the possible home delivery date from the component facility 3, the service condition relay section 104 relays and notifies the conditions for the replacement method including the reservable date of the outlet 4 and the possible home delivery date from the component facility 3 to the vehicle 2 (step S38).

The notification of the stock status of parts and business schedule (reservation status) from the outlet 4 to the information center 1 (step S34), and notification of the possible home delivery date and the payment method from the component facility 3 to the information center 1 (step S37) may be notified regularly (for example, once every morning or the like). In this case, by regularly collecting the information of the outlet 4 and the component facility 3 in the information center 1, then when a repair request is transmitted from the vehicle 2 to the information center 1, the information center 2 can make a reply on the replacement method condition, without confirming with the outlet 4 or the component facility 3 each time. As a result, the time from the repair request to the response can be shortened.

On the other hand, in the vehicle 2, the service condition selection section 205 displays on the display section 28 the condition for the replacement method including the reservable date of the outlet 4 and the possible home delivery date from the component facility 3, received from the information center 1, to allow the user to select full service using the outlet 4, or self service in which the user obtains the part from the component facility and replaces it by himself (step S39).

When the user desires the full service, the user also selects the outlet 4 to be used (step S40).

Confirmation of the area to be sent at the time of self service, and confirmation of the service area of the outlet 4 are then performed (step S41), and the service condition notification section 206 transmits the selection result of the condition for replacement method by the user to the information center 1 (step S42).

When the user desires the full service, in the information center 1 having received the selection result of the condition for replacement method, the service mediation processing section 105 receives the condition for replacement method selected by the user of the vehicle 2, and transmits the contract completion information for confirming the reservation and the service content to the outlet 4 to be used (step S43).

The outlet 4 having received the contract completion information, registers the reserved content and the service content in the internal business control system (step S44).

The service mediation processing section 105 in the information center 1 having received the selection result of the service conditions notifies the outlets which are not selected of this matter.

The outlet 4 having registered the contract completion information in the internal business control system transmits the confirmation information including the reserved date and the service content to the information center 1 from the terminal (step S45), and the information center 1 relays the confirmation information including the reserved date and the service content to the vehicle 2 (step S46).

The vehicle 2 may receive the confirmation information of the reserved date and the service content directly from the outlet 4 (step S47).

In the vehicle 2 having received the confirmation information including the reserved date and the service content from the outlet 4 or the information center 1, the service confirmation processing section 207 displays this on the display section 28 (step S48), to allow the user to input a reply to the confirmation information.

The user visits the outlet 4 on the reserved date for receiving wiper replacement of the vehicle 2.

When the user desires self service, in the information center 1 having received the selection result of the condition for replacement method, the service mediation processing section 105 receives the condition for replacement method selected by the user of the vehicle 2, and transmits a home delivery request of the repair part to be replaced to the component facility 3 (step S49).

The component facility 3 having received the home delivery request arranges shipment of the repair part to be replaced (step S50), and executes the charging processing by a predetermined method (step S51).

The user then replaces the delivered repair part of the vehicle 2 by himself.

Figure 8:
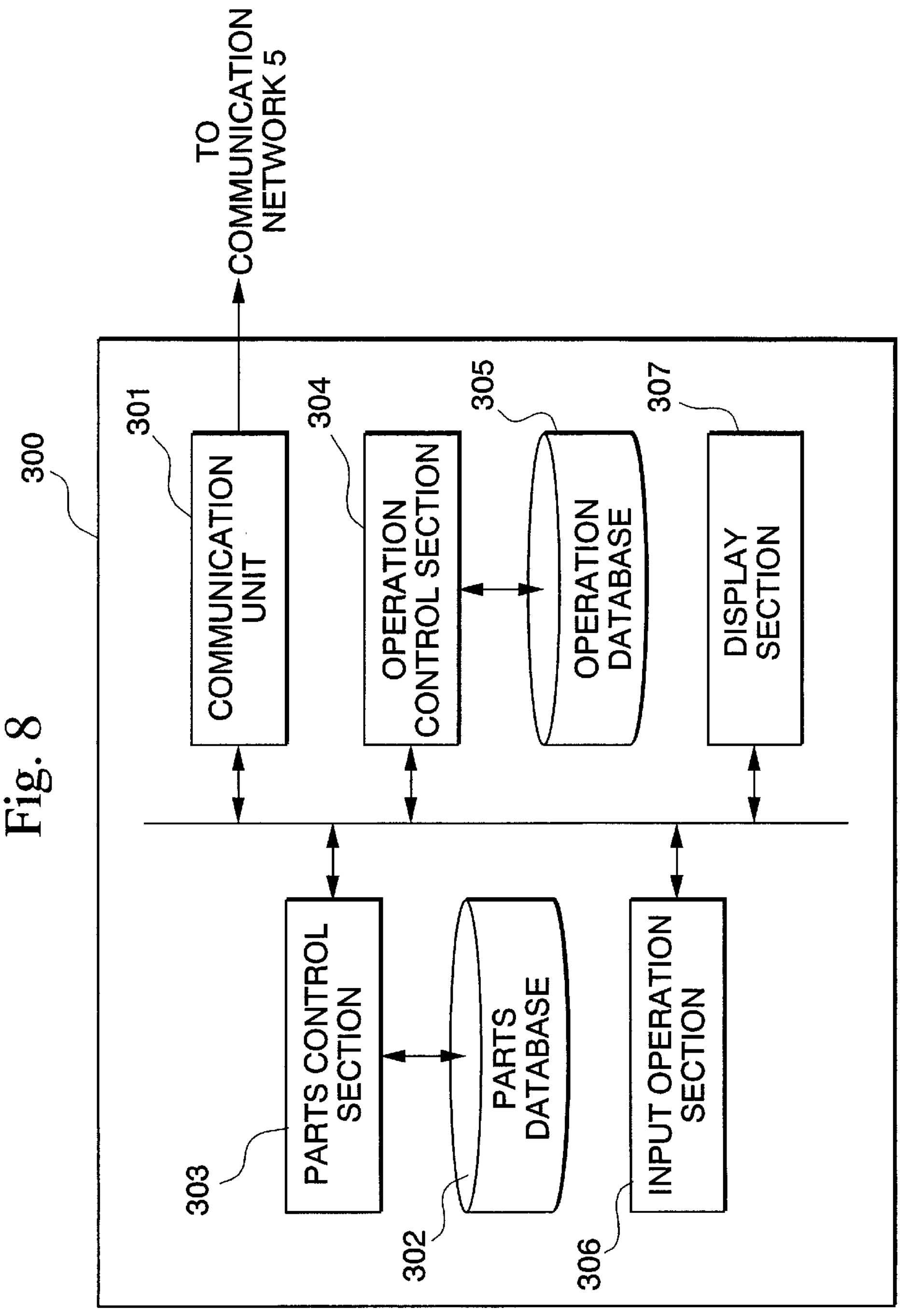
FIG. 8 is a block diagram showing one example of an internal business control system used in an outlet in the service control system in this embodiment.

The internal business control system of the outlet 4 is a system for generalizing the operation control and the parts stock control of the outlet 4, and includes the client terminal of the outlet 4. The internal business control system 300 comprises; as shown in FIG. 8, a communication unit 301 connectable to the communication network 5, a parts database 302 for storing the stock status of the parts, a parts control section 303 for controlling the stock of parts, such as ordering to the component facility 3 and controlling the delivery date, by referring to the parts database 302, an operation control section 304 which controls the reservation schedule and work contents for the repair work received from the information center 1, an operation database 305 for storing the reservation schedule and work contents, an input operation section 306 for operation, and a display section 307.

In the above operation, the information to be transmitted from the information center 1 to the user may be transmitted to a terminal of the user 6, instead of transmitting it to the vehicle 2.

In the above operation, in the case of self service, it has been described that shipment of the parts is performed by the component facility 3 directly in response to the home delivery request. However, the section which receives the home delivery request and dispatches the parts is a sales department such as a wholesale department in the component facility 3, and hence the function of dispatching the parts can be considered to be the same as the function of the outlet 4.

On the contrary, as one form of the outlet 4, there may be provided an agent between the user and the component facility 3 for supplying parts to the user, and the component facility 3 may receive the home delivery request via the agent (outlet 4), or may dispatch the parts via the agent (outlet 4).

In the above operation, it has been described that the outlet selection section 102 in the information center 1 having received the repair request, extracts outlets 4 in the service area of which the address or position information of the user of the vehicle 2 is included, from the outlet database 15. However, the item for extracting the outlet 4 is not limited to the address or position information. For example, an outlet which specializes in the repair work required by the vehicle 2, or an outlet which performs the repair work at a price desired by the user may be extracted, and the user may select the desired outlet based on the information, such as that the address or position information is close to the outlet, or the ambiance in the shop is good, or the like.

One example of an operation screen of the service control system in this embodiment is shown below, with reference to the drawings.

Figure 9:
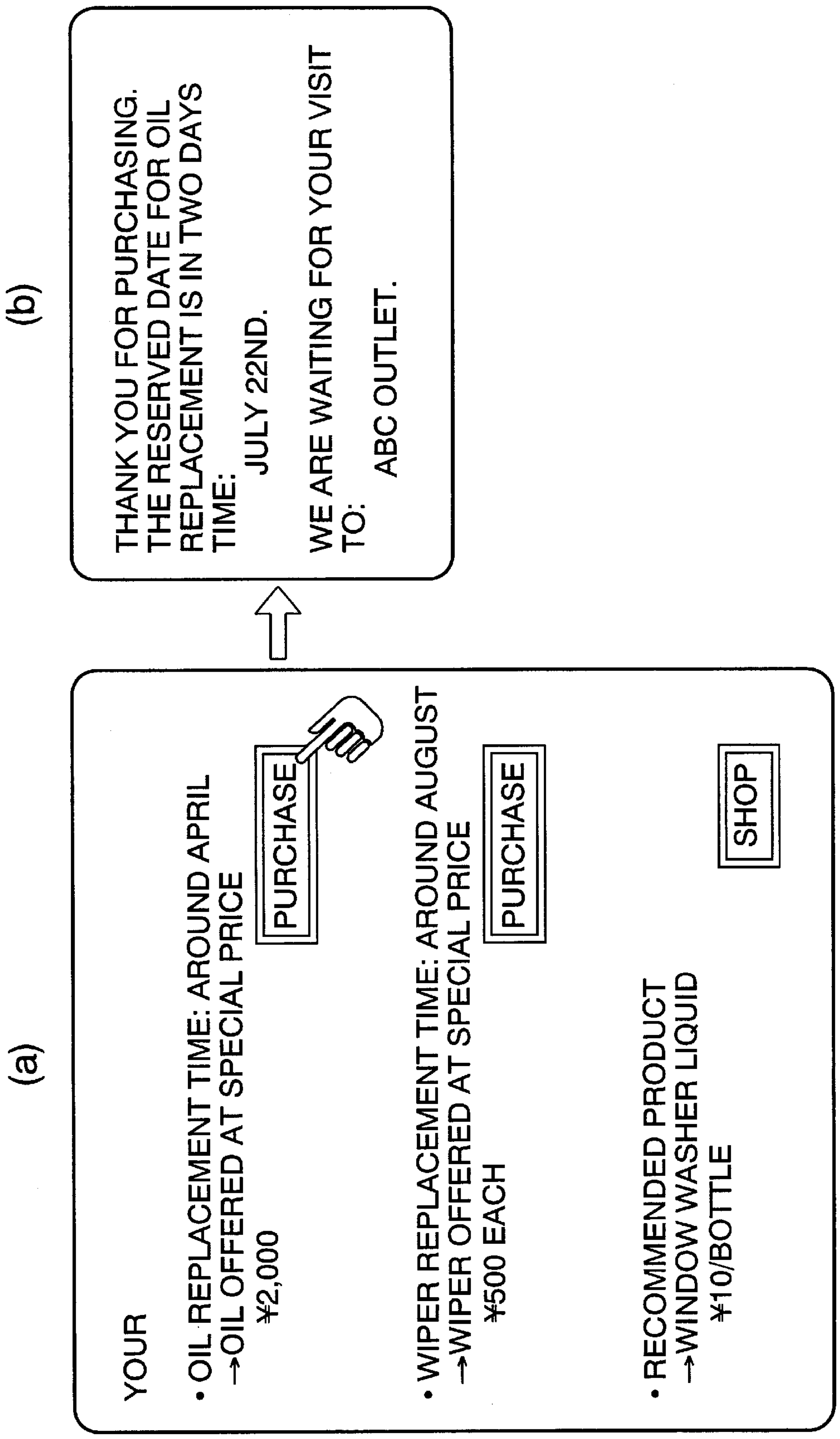
FIG. 9 is a diagram showing one example of a processing screen displayed on a vehicle or a terminal of a user, in the service control system in this embodiment.
Figure 10:
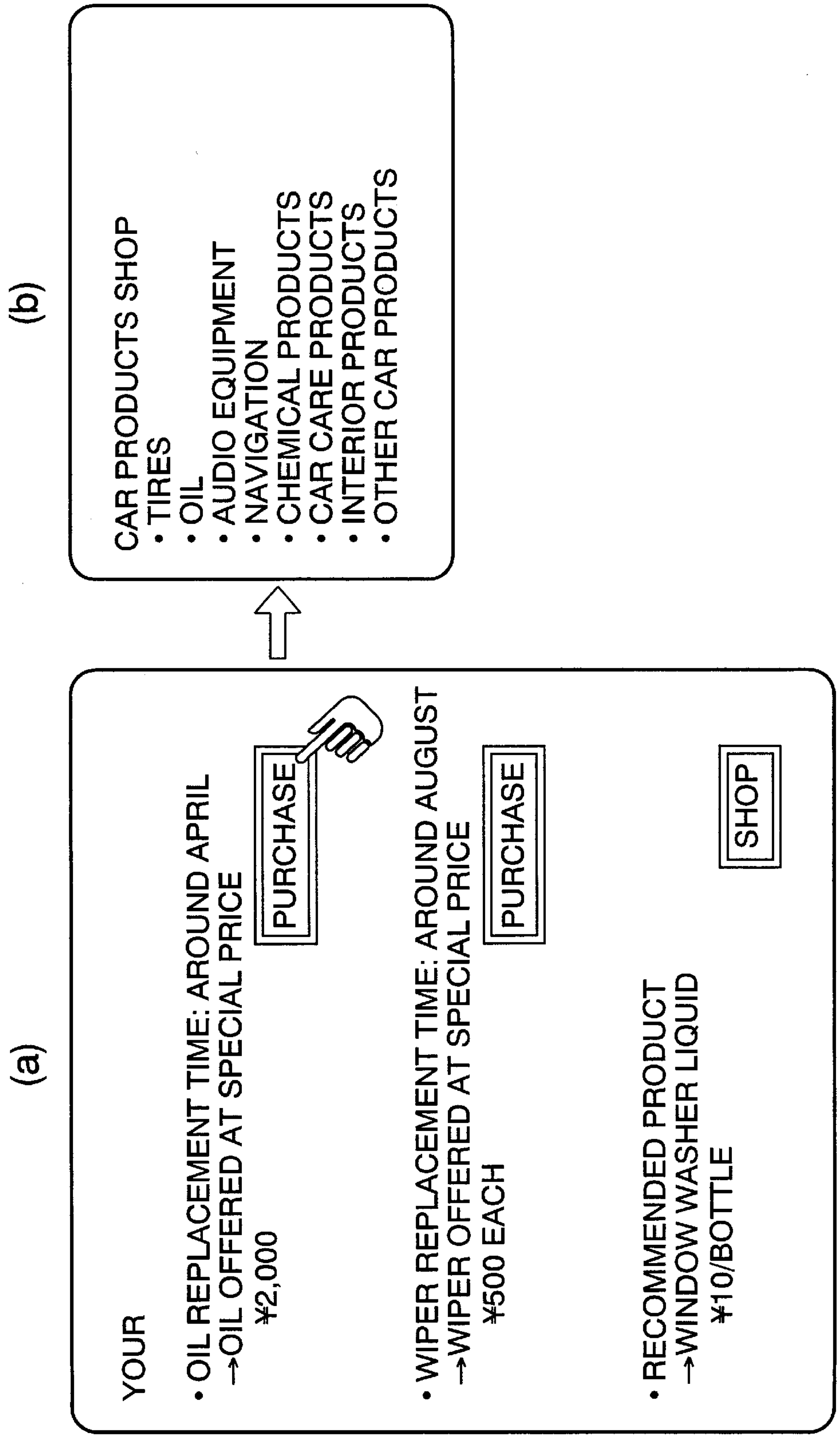
FIG. 10 is a diagram showing one example of the processing screen displayed on the vehicle or the terminal of a user, in the service control system in this embodiment.

FIG. 9 and FIG. 10 show one example of the operation screen displayed on the display section 28 of the vehicle 2 or on the terminal of the user 6. For example, in FIG. 9(*a*), there is shown a screen for displaying the replacement time of the oil or the replacement time of the wiper notified from the information center 1 to the vehicle 2, and recommended products.

For example, when the user desires replacement of oil and clicks the "purchase" button, the information center 1 mediates an agreement between the outlet 4 and the user, and when the agreement is finalized, as shown in FIG. 9(*b*), the information confirming the reserved date and the outlet name is transmitted from the information center 1 to the vehicle 2 or to the terminal of the user 6.

As shown in FIG. 10(*a*), for example, when the user has an interest in the recommended product, and clicks the "SHOP" button, the control proceeds to an operation screen of an electronic shopping system shown in FIG. 10(*b*), for performing mail-order sales using the network, so that the user can freely use electronic shopping as an added service of the outlet.

As described above, the service control system in this embodiment can improve the overall benefit and convenience, in a service performing repair work and sales of repair parts of the vehicle 2, in which the information center 1 regularly collects the information from the vehicle 2 via the communication network, and gives appropriate information and instruction to the component facility 3 and the outlet 4 by using this information.

Figure 11:
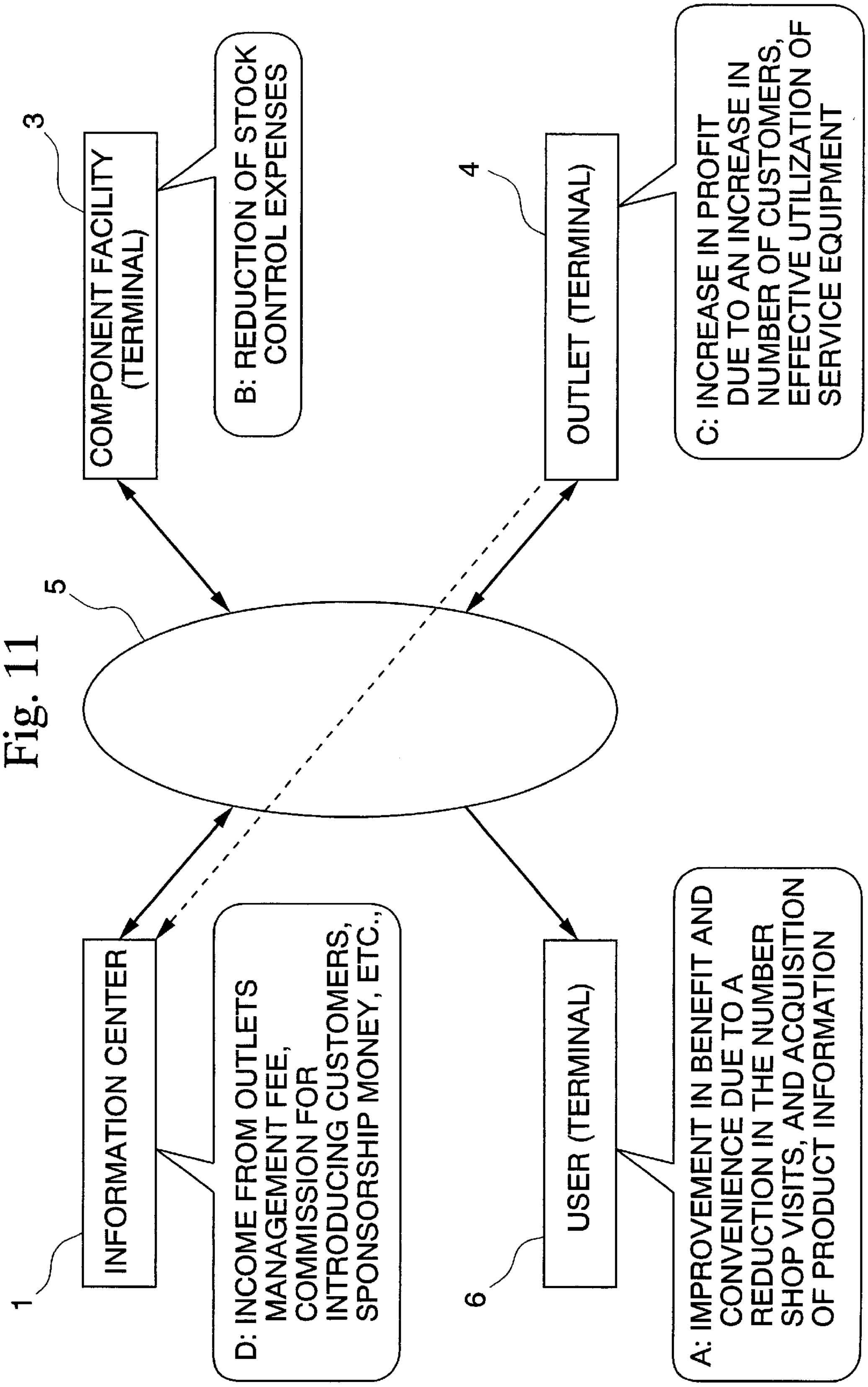
FIG. 11 is a diagram illustrating an effect produced by the service control system in this embodiment.

That is to say, as shown in FIG. 11, the user 6 selects an outlet 4 according to the service condition provided from the information center 1, based on the information collected beforehand from the vehicle 2, and makes a reservation and visits the outlet 4. The outlet 4 obtains the repair request of the user 6 from the information center 1 beforehand, makes arrangement for the parts and waits for the vehicle 2 (user 6) coming to the shop. Therefore, the user 6 needs only to go to the outlet 4 once, and can receive the repair work such as checking, replacement, replenishment and supplement of the parts and equipment of the vehicle 2, and the repair parts including consumables, without being kept waiting for preparation of the parts. Since the number of visits to the outlet decreases, the benefit and convenience to the user is improved. The repair parts referred to herein includes not only the above described consumables and parts but also brake oil, brake pads, transmission oil, various kinds of oil filters, various kinds of air filters and coolant liquid.

Furthermore, the user 6 is relieved of the job of looking for an outlet by himself.

Moreover, the user 6 can obtain information useful for the user 6, such as recommended products and campaigns, as well as the service condition, from the information center 1.

The information center 1 discloses the demand prediction for parts obtained by using the fault diagnosis result and the monitoring result for the service life of the parts transmitted from the vehicle 2, and hence the component facility 3 can make a production schedule and perform appropriate stock control. Therefore, there is the effect that conventional stock control expenses or the like due to parts being produced excessively to maintain stocks and avoid out of stock, can be reduced.

In the outlet 4, by promoting the service condition to the user 6 through the information center 1, an increase in the number of visitors can be expected, and hence income from commission for repair work and the sale profit of new cars is increased. Moreover, since it is possible to efficiently entice the vehicle 2 (user 6) to come to the shop, via the information center 1, there is the effect that the staff, the place, the tools, and facilities such as a car lift and a machine for replacing tires can be efficiently used, through avoiding waste.

In the information center 1, for example, by mediating between the outlet 4 and the user 7 who has heretofore selected the outlet based on his own judgment and efficiently enticing the user 6 to visit the outlet 4, management fees and commissions for introducing customers can be obtained from the outlet 4. Moreover, other incomes such as sponsorship money can be obtained, by making the outlet 4 a sponsor of the information center 1.

According to the first aspect of the invention, when the necessity of repair work arises in the vehicle, a repair request requesting the repair work is transmitted to the information center, to request mediation between an outlet performing the repair work and the vehicle. The information center then transmits a plurality of service conditions for each outlet. Therefore, the administrator of the vehicle selects a desired service condition, and notifies the information center of the selected service condition. The confirmation information of the outlet mediated by the information center is then transmitted, according to the service condition selected by the administrator of the vehicle, and the administrator inputs a reply to the confirmation information to thereby make the final confirmation of the agreement.

Therefore, the administrator of the vehicle visits the outlet only once, according to the final confirmation of the agreement, to receive the repair work for the vehicle, without being kept waiting. Hence there is the effect that the benefit and convenience to the administrator can be improved.

Moreover, when the service condition is proposed, if the service disclosed in FIG. 10 is also provided as an additional service, the administrator of the vehicle can receive the shopping service of the outlet. Hence there is the effect that the benefit and convenience to the administrator can be further improved.

According to the second aspect of the invention, when there is a request for repair work together with the identification information from the vehicle, the information center selects outlets capable of providing the repair work for the vehicle, for the administrator of the vehicle, based on the information of the administrator corresponding to the identification information. The information center then notifies the outlets of the information of the repair request to ask them to propose the service condition. The information center notifies the administrator of the vehicle of the proposed service conditions of the respective outlets, and when the administrator selects a desired service condition, the information center transmits the contract completion information to the outlet which has proposed the service condition selected by the administrator, to mediate the agreement between the administrator and the outlet.

Therefore, the outlet can propose the service condition to the administrator of the vehicle through the information center and promote the service condition. Furthermore, since the agreement is finalized with the administrator through mediation by the information center, there is the effect that the outlet can efficiently gather customers.

Moreover, the administrator of the vehicle can find an outlet without looking for it himself. Furthermore, since the administrator can select from a plurality of service conditions, there is the effect that the benefit and convenience to the administrator is improved.

What is claimed is:

1. A service providing method using a service control system; said service control system comprising:

a determination apparatus which is mounted on a vehicle and determines a condition of repair parts;

an information center which controls determination information output from the determination apparatus;

outlets which manage stock of the repair parts and a repair work of the vehicle; and a communication network which connects the vehicle, the outlets and the information center, the service providing method comprising the steps of:

transmission processing in which the determination information is transmitted from the determination apparatus to the information center;

service condition selection processing in which service conditions related to the outlets transmitted from the information center are offered to an administrator of the vehicle in response to the transmission of the determination information so as to allow the administrator to select a desired service condition from the service conditions;

service condition notification processing in which the desired service condition selected by the administrator is transmitted to the information center; and service confirmation processing in which the outlet corresponding to the desired service condition or the information center transmits confirmation information with respect to the desired service condition to the administrator.

2. The service providing method according to claim 1, wherein the information center comprises a server, the vehicle comprises a client terminal including the determination apparatus, the outlets respectively comprise client terminals, and the server, the client terminal of the vehicle, and the client terminals of the outlets are connected by the communication network so as to construct a Point of Sale (POS).

3. The service providing method according to claim 1, wherein the determination apparatus performs fault diagnosis of the vehicle and calculation of service life of parts of the vehicle using information obtained from sensors and control units mounted on the vehicle so as to obtain the determination information, and transmits the determination information to the information center at predetermined intervals.

4. The service providing method according to claim 3, wherein the information center performs prediction of demands for parts based on the fault diagnosis of the vehicle and the calculation result for the service life of parts, and informs results of the prediction of demands to a component facility which supplies parts to the outlets.

5. The service providing method according to claim 1, wherein the information center comprises a customer database storing information related to the administrator, a parts control database storing information related to parts for at least one model of a plurality of vehicles, and an outlet database storing information related to the outlets, the information center selects at least one of the outlets based on the determination information and information stored in the databases.

6. A service providing method using a service control system; said service control system comprising:

a determination apparatus which is mounted on a vehicle and determines the a condition of repair parts;

an information center which controls determination information output from the determination apparatus;

outlets which manage stock of the repair parts and a repair work of the vehicle; and a communication network which connects the vehicle, the outlets and the information center, the service providing method comprising the steps of:

transmission processing in which the determination information from determination apparatus and identification information of the vehicle are transmitted from the vehicle to the information center;

outlet selection processing in which at least one outlet capable of providing repair work correspond to the determination information for an administrator of the vehicle corresponding to the identification information is selected;

service information providing processing in which a repair request for the vehicle is transmitted to selected outlets;

service condition relay processing in which the information center receives service conditions of the selected outlets transmitted from the selected outlets in response to the transmission of the repair request, and transmits the service conditions to the administrator so as to allow the administrator to select a desired outlet; and service mediation processing in which contract completion information for the repair work is transmitted to the desired outlet.

7. The service providing method according to claim 6, wherein the information center transmits a notification of replacement time for parts and sales information of recommended parts to the vehicle, and, when the vehicle has received the notification, the vehicle transmits a repair request for parts together with a vehicle number of the vehicle to the information center.

8. The service providing method according to claim 6, wherein the information center comprises a server, the vehicle comprises a client terminal including the determination apparatus, the outlets respectively comprise client terminals, and the server, the client terminal of the vehicle, and the client terminals of the outlets are connected by the communication network so as to construct a Point of Sale (POS).

9. The service providing method according to claim 6, wherein the determination apparatus performs fault diagnosis of the vehicle and calculation of service life of parts of the vehicle using information obtained from sensors and control units mounted on the vehicle so as to obtain the determination information, and transmits the determination information to the information center at predetermined intervals.

10. The service providing method according to claim 9, wherein the information center performs prediction of demands for parts based on the fault diagnosis of the vehicle and the calculation result for the service life of parts, and informs results of the prediction of demands to a component facility which supplies parts to the outlets.

11. The service providing method according to claim 6, wherein the information center comprises a customer database storing information related to the administrator, a parts control database storing information related to parts for at least one model of a plurality of vehicles, and an outlet database storing information related to the outlets, and the information center selects at least one of the outlets based on the determination information and information stored in the databases.

12. A service providing method using a service control system which comprises vehicles, outlets, an information center, and a communication network which connects the vehicles, the outlets, and the information center, the service providing method comprising the steps of:

transmitting, from one of the vehicles to the information center, determination information regarding result of fault diagnosis of the vehicle or calculation result of service life of parts in the vehicle;

transmitting repair parts information regarding repair parts corresponding to the determination information from the information center to the vehicle;

transmitting a repair request input in response to the repair parts information from the vehicle to the information center;

transmitting service condition information regarding service conditions of the outlets corresponding to the repair request from the information center to the vehicle;

transmitting a selected service condition selected from the service conditions in the vehicle, from the vehicle to the information center; and transmitting confirmation information which is issued by at least one of the information center and the selected outlets corresponding to the selected service condition to the vehicle.

13. A service providing system comprising vehicles, outlets, an information center, and a communication network which connects the vehicles, the outlets, and the information center, each of the vehicles transmitting, to the information center, determination information regarding result of fault diagnosis of the vehicle or calculation result of service life of parts in the vehicle;

the vehicle receiving repair parts information regarding repair parts corresponding to the determination information from the information center;

the vehicle transmitting a repair request input in response to the repair parts information to the information center;

the vehicle receiving service condition information regarding service conditions of the outlets corresponding to the repair request from the information center;

the vehicle transmitting a selected service condition selected from the service conditions to the information center; and the vehicle receiving confirmation information which is issued by at least one of the information center and the selected outlets corresponding to the selected service condition.

* * * * *